United States Patent [19]

Jones et al.

[11] Patent Number: 4,824,645

[45] Date of Patent: * Apr. 25, 1989

[54] PROCESS FOR SELECTIVELY REMOVING HYDROGEN SULFIDE FROM A GAS STREAM AT HIGH PRESSURE

[75] Inventors: Timothy A. Jones, Carrollton; Earl S. Snavely, Arlington, both of Tex.

[73] Assignee: Mobil Oil Corporation, New York, N.Y.

[*] Notice: The portion of the term of this patent subsequent to Mar. 10, 2004 has been disclaimed.

[21] Appl. No.: 614,010

[22] Filed: May 25, 1984

Related U.S. Application Data

[63] Continuation-in-part of Ser. No. 361,947, Mar. 25, 1982, abandoned, which is a continuation-in-part of Ser. No. 336,796, Jan. 4, 1982, abandoned.

[51] Int. Cl.$^4$ .................... B01D 53/16; C01B 17/05
[52] U.S. Cl. .................. 423/226; 423/576.6
[58] Field of Search ............ 423/226, 228, 571, 575, 423/573 R

[56] References Cited

U.S. PATENT DOCUMENTS

| | | | |
|---|---|---|---|
| 2,548,498 | 2/1948 | Russel et al. | 423/437 |
| 2,747,962 | 5/1956 | Heitz et al. | 423/226 |
| 3,933,993 | 1/1976 | Salemme | 423/226 |
| 4,036,942 | 7/1977 | Sibeud et al. | 423/226 |
| 4,499,059 | 2/1985 | Jones et al. | 423/226 |

FOREIGN PATENT DOCUMENTS 3000250 7/1981 Fed. Rep. of Germany ...... 423/228

OTHER PUBLICATIONS

*Fundamentals of Chemical Reaction Engineering*, Holland, C. D. and Anthony, R. G., Prentice-Hall, 1979, p. 10.

*Chemical Engineering Handbook*, Perry and Chilton, 5th Edition, 1973, p. 4-3.

"Amine Treating of Sour Gas: Good Riddance to $H_2S$", Chemical Engineering, Oct. 29, 1962, vol. 69, No. 22.

"Diglycolamine-A Promising New Acid-Gas Remover", the Oil and Gas Journal, May 2, 1966, pp. 83–86.

J. C. Dingman et al., "Compare DGA and MEA Sweetening Methods", Hydrocarbon Processing, Jul. 1968, vol. 47, No. 7, pp. 138–140.

Ronald W. Hohlfeld, "New $H_2S$-Scrubber Cleans Small or Large Gas Streams", Oil and Gas Journal, Oct. 15, 1979, pp. 179–180.

R. W. Hohlfeld, "Selective Absorption of $H_2S$ from Sour Gas", Society of Petroleum Engineers of AIME, SPE 7972, presented Apr. 18–20, 1974.

L. C. Hardison, "Go from $H_2S$ to S in one Unit", Hydrocarbon Processing, vol. 64, No. 4, Apr. 1985, pp. 70–71.

*Primary Examiner*—John Doll
*Assistant Examiner*—Jeffrey Edwin Russel
*Attorney, Agent, or Firm*—Alexander J. McKillop; Charles J. Speciale

[57] ABSTRACT

Hydrogen sulfide can be removed selectively from a gas stream also containing carbon dioxide at high pressure, such as those found at natural gas production wellheads, by contacting the gas stream with an alkaline liquid for a time period of less than about 80 milliseconds.

3 Claims, 1 Drawing Sheet

IRON CHELATE STABILITY WHEN HEATED TO 129°C WITH DIFFERENT ADDITIVES

IRON CHELATE STABILITY WHEN HEATED TO 129°C WITH DIFFERENT ADDITIVES

DOW CHEMICAL VERSONAL IRON CHELATE HEAT STABILITY TEST USING SODIUM CARBONATE AS ALKALI WITH 10% MOLAR EXCESS EDTA POWDER

EFFECTS OF IRON AND CHELATE HEAT STABILITY DUE TO ELEMENTAL SULFUR IN THE SOLUTION

IRON CHELATE STABILITY WHEN HEATED TO 129°C WITH DIFFERENT ALKALI SOLUTIONS

DOW CHEMICAL VERSENOL IRON CHELATE HEAT STABILITY TEST USING AMMONIUM CARBONATE AS ALKALI-10% MOLAR EXCESS EDTA USING DOW CHEMICAL VERSENE SOLUTION

IRON CHELATE SOLUBILITY WHEN HEATED TO 129°C USING DIFFERENT IRON CHELATE SUPPLIERS

PROCESS FOR SELECTIVELY REMOVING HYDROGEN SULFIDE FROM A GAS STREAM AT HIGH PRESSURE

CROSS-REFERENCE TO RELATED APPLICATIONS

The present application is a continuation-in-part of Ser. No. 361,947 filed Mar. 25, 1982, now abandoned in favor of Ser. No. 690,545, filed Jan. 11, 1985, now U.S. Pat. No. 4,649,052. Ser. No. 361,947 was a continuation-in-part of Ser. No. 336,796 filed Jan. 4, 1982, now abandoned. These applications are directed to a process for removing hydrogen sulfide from a gas stream by absorption and oxidation with an alkaline metal chelate solution, followed by regeneration of the metal chelate solution by oxidation and separation of elemental sulfur. Ser. No. 507,367 filed June 24, 1983, now adandoned, a divisional of Ser. No. 361,947, is directed to a method and apparatus for regenerating the metal chelate solution. Ser. No. 395,896 filed July 7, 1982, now abandoned, is directed to the removal of hydrogen sulfide from gas streams with alkaline liquids using short gas-liquid contact times. Ser. No. 552,240 now U.S. Pat. No. 4,499,059 filed Nov. 16, 1983, is directed to the removal of hydrogen sulfide from gas streams under highly turbulent conditions. Our co-pending application, Ser. No. 614,009, entitled "Method of Separating Elemental Sulfur Particles From an Iron Chelate Solution", filed on even date herewith, now abandoned, describes the removal of sulfur particles from an iron chelate solution by melting, without excessive iron loss, by increasing the chelate concentration. The disclosures of all of the above-mentioned applications are incorporated herein by reference.

BACKGROUND OF THE INVENTION

The present invention is directed to the selective removal of hydrogen sulfide from a gas stream. In particular, the present invention is directed to the selective removal of hydrogen sulfide from a high pressure gas stream which also contains carbon dioxide by using a metal chelate solution. Through operation at high pressures, the present invention may be used in situations where low pressure operation would be costly and time-consuming, such as in the removal of hydrogen sulfide from the gas stream of a natural gas production well.

SUMMARY OF THE INVENTION

The present invention is directed to the removal of hydrogen sulfide from a gas stream containing hydrogen sulfide and carbon dioxide by contacting the gas stream with an alkaline solution for a time less than 0.08 sec. to absorb hydrogen sulfide and not carbon dioxide. The gas stream, which can be from the well head of a natural gas production well, may be maintained at a pressure of 760–880 psig. The alkaline liquid may be a polyvalent metal-chelate solution, preferably iron-HEDTA (N-hydroxyethylethylenediaminetriacetic acid).

DETAILED DESCRIPTION OF THE INVENTION

Figure 1:
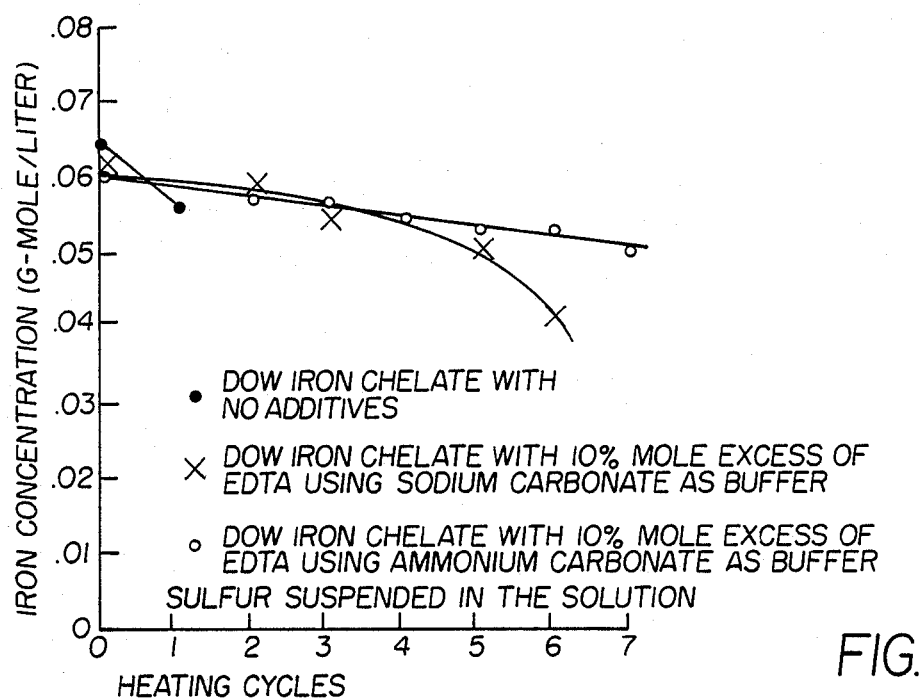
FIG. 1 is a schematic representation of the equipment used in the experimental work described below.

As noted above, the present process is directed to the selective removal of hydrogen sulfide from a gas stream at high pressure. The following apparatus and procedure were used in conducting the high pressure removal of hydrogen sulfide with an alkaline absorbing solution. Referring to FIG. 1, wellhead gas was contacted with absorbing solution in a static mixer and quickly separated in a gas/liquid separator. The gas/liquid separator was operated at the wellhead pressure, while the gas flow rate was varied through the use of value $V_1$. An orifice flange was set up to measure the gas flow rate downstream of valve $V_1$. The pressure gauge on the gas/liquid separator indicated wellhead pressure when valve $V_1$ was shut and flowing pressure during testing. Valve $V_2$ was opened slightly to allow a slow flow to the gas chromatograph and the hydrogen sulfide tube samplers.

Liquid was pumped to the static mixer by a variable speed Zenith gear pump. A two-liter cell was used for the liquid reservoir, and wellhead pressure pressurized the liquid reservoir which fed the pump. The wellhead gas which pressurized the liquid reservoir first passed through a methyldiethanol amine scrubber which removed the acid gases from the gas. Wellhead temperature was monitored by a thermocouple, in-line with a pyrometer.

Three solutions were tested. The first solutin was 50% by weight methyldiethanol amine. The amine was purchased from Pfaltz and Bauer, Inc. The remaining two solutions were dilutions of Dow Chemical's Versenol 5% iron chelate solution, and iron-HEDTA chelate solution. The concentration of the solutions were 0.32 molar and 0.11 molar, and the pH of each was adjusted to 9.2 with ammonium carbonate solution.

The gas tested had a composition of 95.3 mole percent methane, 1.5 mole percent ethane, 0.3 mole percent propane, 0.4 mole percent nitrogen, 1.8 mole percent carbon dioxide, 0.1 mole percent hydrogen sulfide and 0.6 mole percent other hydrocarbons. The gas was tested at pressures from 760 to 880 psig. Four different sizes of static mixers were used during the test: $\frac{1}{2}$" diameter by 6" long; $\frac{3}{8}$" diameter by $\frac{1}{2}$" long; $\frac{1}{4}$" diameter by $\frac{1}{2}$" long; and $\frac{1}{4}$" diameter by 5" long.

Figure 2:
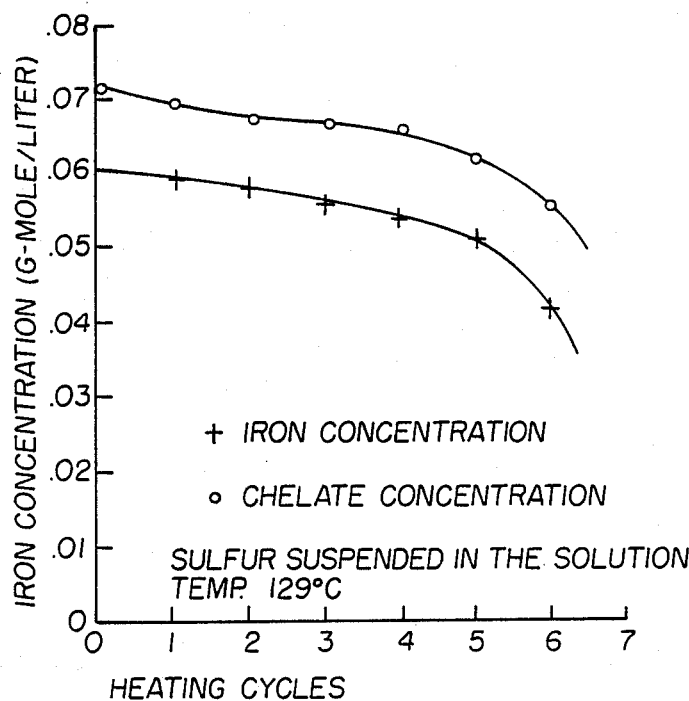
FIGS. 2–4 are graphical representations of the data obtained in the experimental work described below.

In the first test, the 50% by weight amine solution was used with the $\frac{1}{2}$" static mixer. The gas flow rate was set at 3,000 standard cubic feet per hour, which resulted in a gas-liquid contact time in the static mixer of 100 milliseconds. This was the maximum flow rate that could be run with this equipment because of pressure drop limitations in the equipment. Five liquid flow rates were run, and the results are shown in FIG. 2. This figure shows the percent of hydrogen sulfide removed as a function of excess molar amine pumped. Approximately 9% of the carbon dioxide also was removed with the hydrogen sulfide. This was not unexpected, because of the relatively long contact time between the liquid and the gas. About 70% of the hydrogen sulfide was removed with a pumped amine stoichiometric excess of 300%.

To reduce the gas-liquid contact time, the $\frac{3}{8}$" static mixer was used. With a gas flow rate of 2,100 scfh, a contact time in the static mixer of 17 milliseconds was maintained for the second test. As can be seen in FIG. 2, at the shorter contact time, the hydrogen sulfide still was removed, but not as efficiently as at the longer contact time. Carbon dioxide also removed (about 8%) which was not expected. These results illustrate that both the amine/hydrogen sulfide and amine/carbon dioxide reactions are kinetically limited. Other work has shown that carbon dioxide removal is diffusion limited, and can be controlled by limiting the gas-liquid contact time to under 80 milliseconds.

Figure 3:
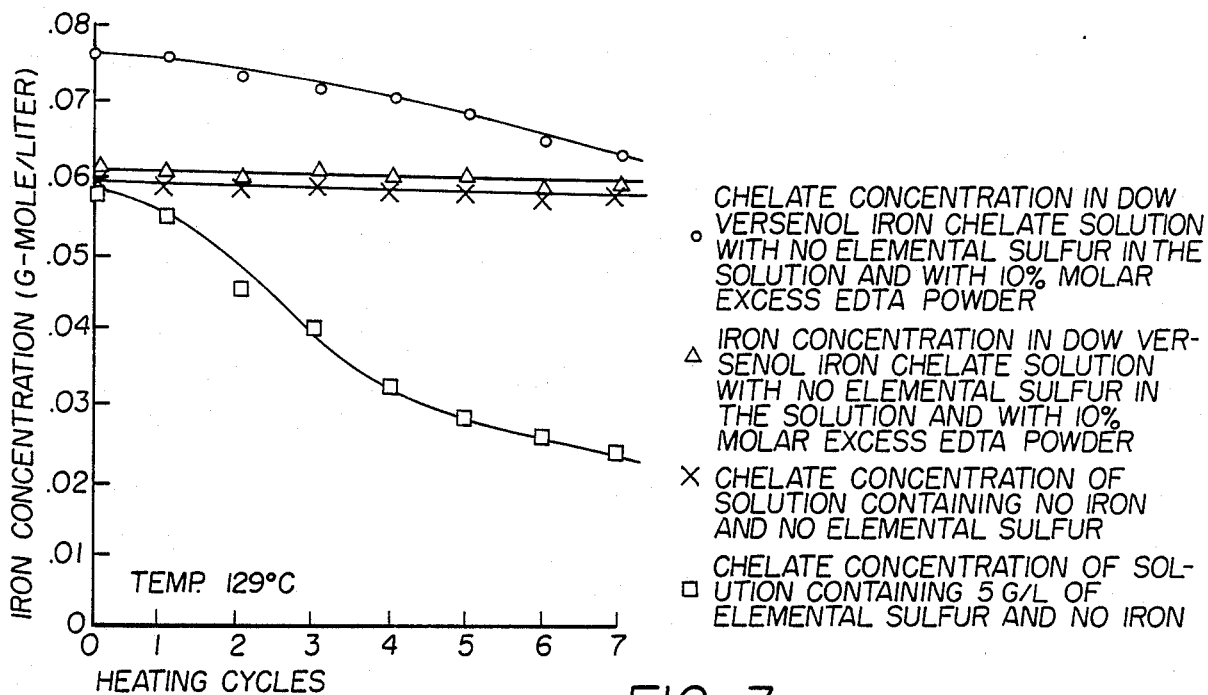

A concentrated iron chelate solution also was run to determine if selective hydrogen sulfide absorption could be achieved at the higher pressures. Because of limited pumping rates, less gas was processed in this test. The $\frac{1}{4}"\times 2\frac{1}{2}$ static mixer was used to obtain a short gas-liquid contact time of 17 milliseconds. FIG. 3 shows that in contacting the gas with a 12-fold stoichliometric excess of iron, 89% of the hydrogen sulfide was removed with no carbon dioxide absorption. For either iron chelate or amine solutions, a stoichiometric excess over the hydrogen sulfide is necessary, since the mixing does not provide for a stoichiometric reaction.

The $\frac{1}{4}"\times 5"$ static mixer then was tested and operated at the same gas rate. This produced a gas-liquid contact time of 30 milliseconds in the static mixer, doubling not only the contact time, but also the number of mixing elements in the static mixer. FIG. 3 shows that a slight increase in hydrogen sulfide absorption was achieved with no carbon dioxide absorption. This shows that the tax mixing elements in the $\frac{1}{4}"\times 2\frac{1}{2}"$ static mixer was sufficient to obtain the needed liquid dispersion to assure kinetic control of the reaction.

In the next test, the iron chelate solution was diluted to yield a final iron chelate concentration of 0.11M, as opposed to the 0.32M solution tested previously. Again, no carbon dioxide was absorbed during the test. As shown in FIG. 3, to achieve 80% hydrogen sulfide removal, a 380% molar excess of iron chelate was needed. The data from all the tests are given in the Table below.

Figure 4:
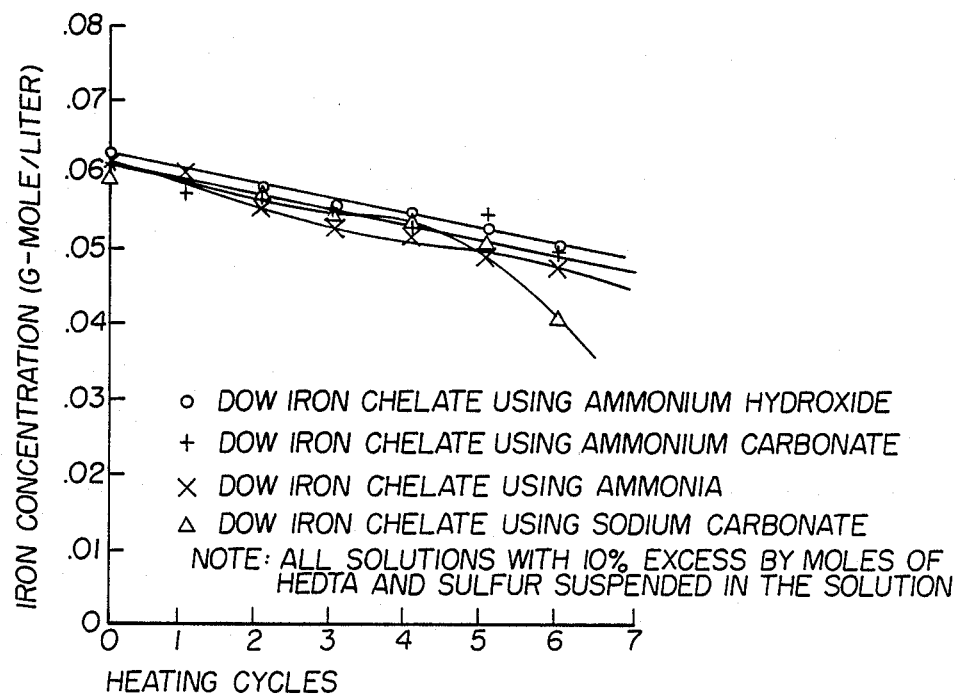
Figure 5:
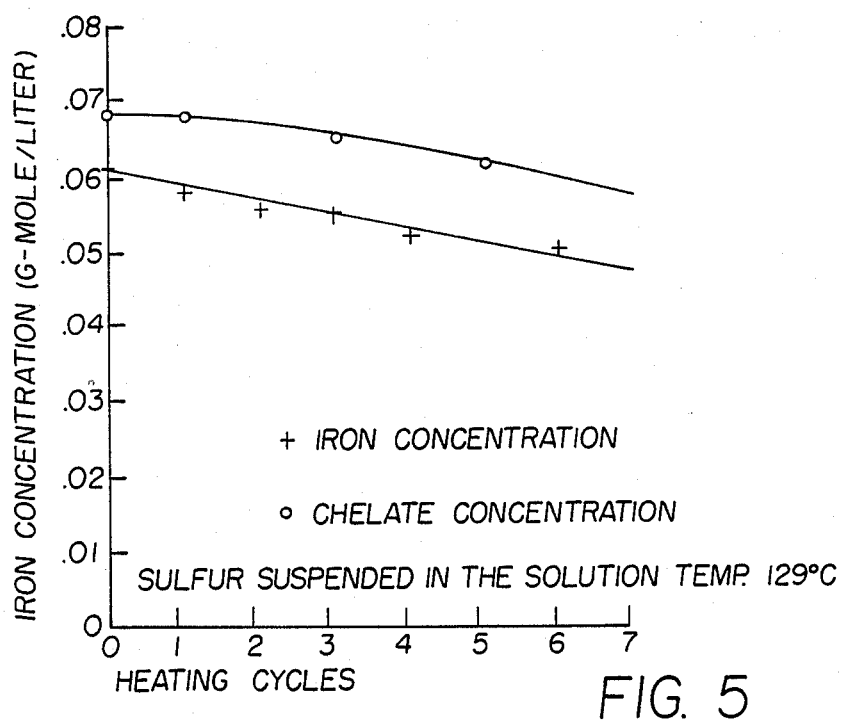
Figure 6:
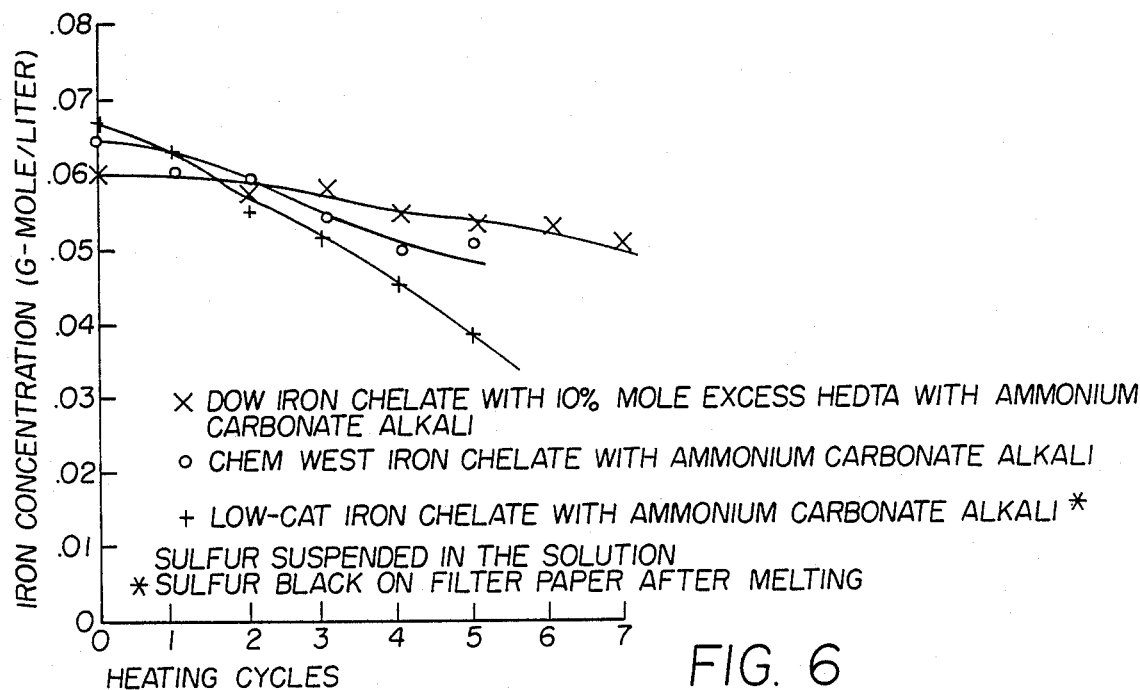

FIG. 4 shows the same data as FIG. 3, but as a function of pumping rate. The dilute solution is not as efficient in this case. However, only a 5% increase in hydrogen sulfide removal is seen over the dilute solution. Since concentration appears to make very little difference, the limiting factor for the concentrations tested is the total liquid surface area. The total liquid surface area is a function of the mean drop diameter and the volume of liquid pumped. The mean drop diameter is controlled by the type and number of static mixer elements used along with the velocity of the fluids and the physical properties of both the liquid and gas. This has been described in our co-pending Application Ser. No. 552,240 now U.S. Pat. No. 4,499,059 discussed previously. Using static mixers with a gas-liquid system, a stable mean drop diameter is obtained with two to six static mixer elements. Additional elements do not reduce the mean drop diameter. Thus, with six mixing elements, the total liquid surface area can be controlled by varying the liquid flow rate, and hence at constant gas rates and solution pH's, the hydrogen removal efficiency can be controlled by varying the liquid flow rate.

The polyvalent metal chelate solution must have a pH of at least 7, perferably 8–9, and may be a polyvalent metal chelate solution, with pH adjusted by sodium or ammonium carbonate. The polyvalent metal may be selected from iron, copper, manganese, lead, mercury, palladium, platinum, tungsten, nickel, chromium, cobalt, vanadium, titanium, tantalum, zirconium, molybendum and tin, preferably iron, copper and manganese, and most preferably iron. The chelating agent may be selected from amino acetic acids derived from ammonia or 2-hydroxyalkylamines, such as glycine, diglycine (aminodiacetic acid), nitrilo triacetic acid, 2-hydroxyalkylglycine, di-hydroxyalkylglycine and hydroxyethyl or hydroxypropylidiglycine, amino acetic acids derived from ethylene diamine, diethylenetriamine, 1,2-propylenediamine and 1,3-propylenediamine, such as EDTA, 2-hydroxy EDTA, and diethylene triamine pentacetic acid, amino acetic acid derivatives of cyclic 1,2-diamines, such as 1,2-diaminocyclohexane-N, N-tetraacetic acid, and amides of polyamino acetic acids, as disclosed in U.S. Pat. No. 3,580,950 to Bersworth. EDTA and N-hydroxyethylethylenediaminetriactic acid (HEDTA) are particularly preferred. The alkaline liquid also may be selected from aqueous solutions of inorganic salts having an alkaline reaction, such as alkali metal hydroxides, phosphates,

TABLE

| Solution | Static Mixer | Gas Rate (ft³/hr) | Solution Rate (ml/min) | % $H_2S$ Removed | Gas/Liquid Contact Time (MS) |
|---|---|---|---|---|---|
| 50% wt. MDEA | $\frac{1}{2} \times 6$ in | 3000 | 25 | 40 | 100 |
| 50% wt. MDEA | $\frac{1}{2} \times 6$ in | 3000 | 60 | 70 | 100 |
| 50% wt. MDEA | $\frac{1}{2} \times 6$ in | 3000 | 19 | 20 | 100 |
| 50% wt. MDEA | $\frac{1}{2} \times 6$ in | 3000 | 36 | 40 | 100 |
| 50% wt. MDEA | $\frac{1}{2} \times 6$ in | 3000 | 61 | 60 | 100 |
| 50% wt. MDEA | $\frac{3}{8} \times 4\frac{1}{2}$ in | 3000 | 24 | 30 | 14 |
| 50% wt. MDEA | $\frac{3}{8} \times 4\frac{1}{2}$ in | 3000 | 50 | 70 | 14 |
| 50% wt. MDEA | $\frac{3}{8} \times 4\frac{1}{2}$ in | 2100 | 50 | 60 | 20 |
| 50% wt. MDEA | $\frac{3}{8} \times 4\frac{1}{2}$ in | 2100 | 65 | 60 | 20 |
| 50% wt. MDEA | $\frac{3}{8} \times 4\frac{1}{2}$ in | 200 | 3 | 50 | 200 |
| 50% wt. MDEA | $\frac{3}{8} \times 4\frac{1}{2}$ in | 2100 | 96 | 65 | 17 |
| 50% wt. MDEA | $\frac{3}{8} \times 4\frac{1}{2}$ in | 2100 | 216 | 70 | 17 |
| 50% wt. MDEA | $\frac{3}{8} \times 4\frac{1}{2}$ in | 2100 | 355 | 92 | 17 |
| .32 M Iron Chelate | $\frac{1}{4} \times 2\frac{1}{2}$ in | 425 | 10 | 15 | 17 |
| .32 M Iron Chelate | $\frac{1}{4} \times 2\frac{1}{2}$ in | 425 | 15 | 26 | 17 |
| .32 M Iron Chelate | $\frac{1}{4} \times 2\frac{1}{2}$ in | 425 | 24 | 37 | 17 |
| .32 M Iron Chelate | $\frac{1}{4} \times 2\frac{1}{2}$ in | 425 | 287 | 85 | 16 |
| .32 M Iron Chelate | $\frac{1}{4} \times 2\frac{1}{2}$ in | 425 | 540 | 89 | 15 |
| .32 M Iron Chelate | $\frac{1}{4} \times 2\frac{1}{2}$ in | 425 | 141 | 59 | 17 |
| .32 M Iron Chelate | $\frac{1}{4} \times 5$ in | 425 | 150 | 68 | 34 |
| .32 M Iron Chelate | $\frac{1}{4} \times 5$ in | 425 | 330 | 86 | 32 |
| .32 M Iron Chelate | $\frac{1}{4} \times 5$ in | 425 | 630 | 89 | 29 |
| .11 M Iron Chelate | $\frac{1}{4} \times 5$ in | 425 | 250 | 72 | 32 |
| .11 M Iron Chelate | $\frac{1}{4} \times 5$ in | 425 | 660 | 86 | 29 | borates, metaborates or arsenites, solutions of organic bases, such as alkanolamines, like monoethanol amine, diethanolamine, triethanolamine, N-methyldiethanolamine, alkanoldiamines, alkenylpolyamines, or solutions of salts of weak organic acids, such as amino carboxylic acids and aminosulfonic acids, or other alkaline liquids. Alkali metal hydroxides and alkanolamines are preferred, particularly diethanolamine and N-methyldiethanolamine.

Thus, the present invention provides a process for the selective removal of hydrogen sulfide from a gas stream also containing carbon dioxide, at high pressure, by contacting the gas stream with an alkaline liquid. A limited gas-liquid contact time of less than 0.08 sec. allows selective removal of hydrogen sulfide.

Although a detailed description of the present invention has been provided above, the present invention is not limited thereto. Modifications will be apparent to those of ordinary skill which are not outside the scope of the invention, which is defined in the following claims.

We claim:

1. A method for selectively removing hydrogen sulfide from a gas stream from a natural gas production well containing hydrogen sulfide and carbon dioxide, comprising contacting the gas stream with a stoichiometric excess of a polyvalent metal chelate solution over said hydrogen sulfide said solution having a pH of about 8.0 to 9.2 for a time period less than 80 milliseconds to absorb hydrogen sulfide and not carbon dioxide, by flowing said gas stream and said solution past from two to six mixing elements in a static mixer, said gas stream being at a wellhead pressure of about 760–880 psig during said contacting period.

2. A method according to claim 1, wherein said polyvalent metal chelate solution is an iron-HEDTA solution.

3. A method according to claim 1, wherein the gas stream and the solution flow past six mixing elements.

* * * * *

UNITED STATES PATENT AND TRADEMARK OFFICE
CERTIFICATE OF CORRECTION

PATENT NO. : 4,824,645

DATED : April 25, 1989

INVENTOR(S) : Timothy A. Jones and Earl S. Snavely

It is certified that error appears in the above-identified patent and that said Letters Patent is hereby corrected as shown below:

Column 2, line 30, "solutin" should read --solution--.

Column 2, line 45, "1/2" should read -- 4 1/2--.

Column 2, line 46, "1/2" should read -- 2 1/2--.

Column 3, line 12, "shorr" should read --short--.

Signed and Sealed this

Second Day of February, 1993

Attest:

STEPHEN G. KUNIN

Attesting Officer     Acting Commissioner of Patents and Trademarks